(12) United States Patent
Satou et al.

(10) Patent No.: US 11,550,305 B2
(45) Date of Patent: Jan. 10, 2023

(54) DIAGNOSTIC APPARATUS FOR GENERATING VERIFICATION DATA INCLUDING AT LEAST ONE PIECE OF ABNORMAL DATA BASED ON NORMAL DATA

(71) Applicant: FANUC CORPORATION, Yamanashi (JP)

(72) Inventors: Kazuhiro Satou, Yamanashi (JP); Kazunori Iijima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 125 days.

(21) Appl. No.: 17/030,373

(22) Filed: Sep. 24, 2020

(65) Prior Publication Data

US 2021/0103273 A1  Apr. 8, 2021

(30) Foreign Application Priority Data

Oct. 2, 2019 (JP) .............................. JP2019-182478

(51) Int. Cl.
*G05B 19/418* (2006.01)
*G05B 23/02* (2006.01)
*G06N 20/00* (2019.01)

(52) U.S. Cl.
CPC ....... *G05B 19/4183* (2013.01); *G05B 23/024* (2013.01); *G06N 20/00* (2019.01); *G05B 23/0237* (2013.01); *G05B 2219/31211* (2013.01); *G05B 2219/31264* (2013.01); *G05B 2219/31484* (2013.01)

(58) Field of Classification Search
CPC ............. G05B 19/4183; G05B 23/024; G05B 23/0237; G05B 2219/31211; G05B 2219/31264; G05B 2219/31484
USPC ......................................................... 700/116
See application file for complete search history.

(56) References Cited

U.S. PATENT DOCUMENTS

2017/0024649 A1\* 1/2017 Yan ...................... G06N 3/0454
2019/0101908 A1\* 4/2019 Park ................... G05B 23/0281
2019/0210176 A1\* 7/2019 Yamamoto ......... G05B 19/4065

FOREIGN PATENT DOCUMENTS

JP          6453504 B1    1/2019
JP        201912473 A     1/2019

\* cited by examiner

*Primary Examiner* — Jigneshkumar C Patel
(74) *Attorney, Agent, or Firm* — Hauptman Ham, LLP (57) ABSTRACT

A diagnostic apparatus of the invention acquires normal data related to an operating state during normal operation of an industrial machine, stores the normal data, generates a learning model by learning based on the stored normal data, and performs an estimation process for normality or abnormality of an operation of the industrial machine using the learning model. The diagnostic apparatus of the invention further generates verification data including at least one piece of abnormal data based on the stored normal data to verify validity of the learning model on receiving a result of the estimation process using the learning model based on the verification data.

5 Claims, 8 Drawing Sheets

NORMAL DATA (TIME SERIES DATA)

FIG.4B

ABNORMAL DATA (TIME SERIES DATA)

FIG.5A

NORMAL DATA (TIME SERIES DATA)

FIG.5B

ABNORMAL DATA (TIME SERIES DATA)

ADDITION OF ax + b COMPONENT

FIG.6A

NORMAL DATA (TIME SERIES DATA)

FIG.6B

ABNORMAL DATA (TIME SERIES DATA)

DATA VALUE DEFECT

FIG.7A

NORMAL DATA (TIME SERIES DATA)

FIG.7B

ABNORMAL DATA (TIME SERIES DATA)

SAMPLING DEFECT

DIAGNOSTIC APPARATUS FOR GENERATING VERIFICATION DATA INCLUDING AT LEAST ONE PIECE OF ABNORMAL DATA BASED ON NORMAL DATA

RELATED APPLICATION

The present application claims priority to Japanese Patent Application Number 2019-182478 filed on Oct. 2, 2019, the disclosure of which is hereby incorporated by reference herein in its entirety.

BACKGROUND OF THE INVENTION

1. Field of the Invention

The present application relates to a diagnostic apparatus.

2. Description of the Related Art

In a manufacturing site such as a factory, in order to monitor an operating state of an industrial machine such as a robot or a machine cool installed on a production line and prevent the production line from stopping, and in order to be able to promptly restore the production line when the production line is stopped, an apparatus for diagnosing the operating state of the industrial machine has been introduced.

The apparatus for diagnosing the operating state of the industrial machine, for example, monitors data such as a position, a speed and torque of a motor detected by each industrial machine via a network and data such as sound and an image detected by a sensor attached to the industrial machine via the network, and diagnoses that an abnormality has occurred in an operation of the industrial machine when there is a tendency indicating the abnormality in the monitored data (in particular, JP 6453504 B1 and JP 2019-012473 A). In order for the diagnostic apparatus to make such a diagnosis, it is necessary to generate in advance a predetermined model for determining whether the operation of the industrial machine is normal or abnormal.

Examples of the model for determining normality/abnormality of the operation of the industrial machine include: (1) a model for determining how close to a data group detected while the industrial machine is in abnormal operation, (2) a model for determining how far apart from which of boundaries of data groups acquired during normal operation/abnormal operation, respectively, and (3) a model for determining how far apart from a data group detected while the industrial machine is in normal operation. In the case of the models (1) and (2), it is necessary to detect and store data while the industrial machine is in abnormal operation. However, abnormal operation of the industrial machine is related to failure in many cases, and it is difficult to collect data necessary to generate a model for determination. On the contrary, in the case of the model (3), because data can be detected and stored while the industrial machine is in normal operation, the diagnostic apparatus can relatively easily collect the data.

Figure 8A:
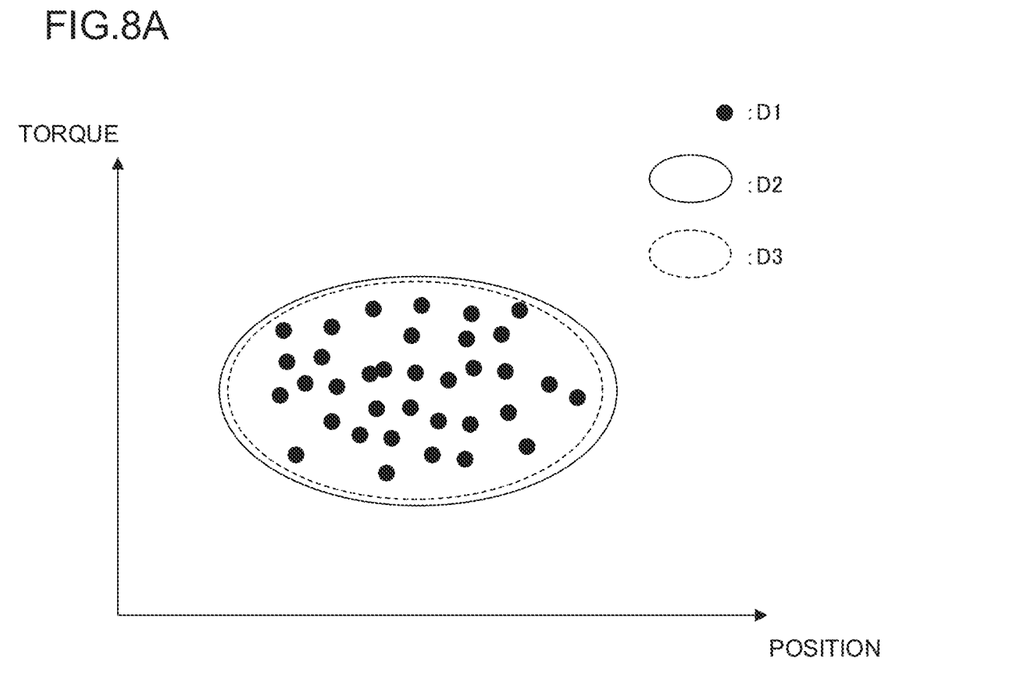
FIGS. 8A and 8B are diagrams for description of a problem of generating a model for operation diagnosis of an industrial machine.
Figure 8B:
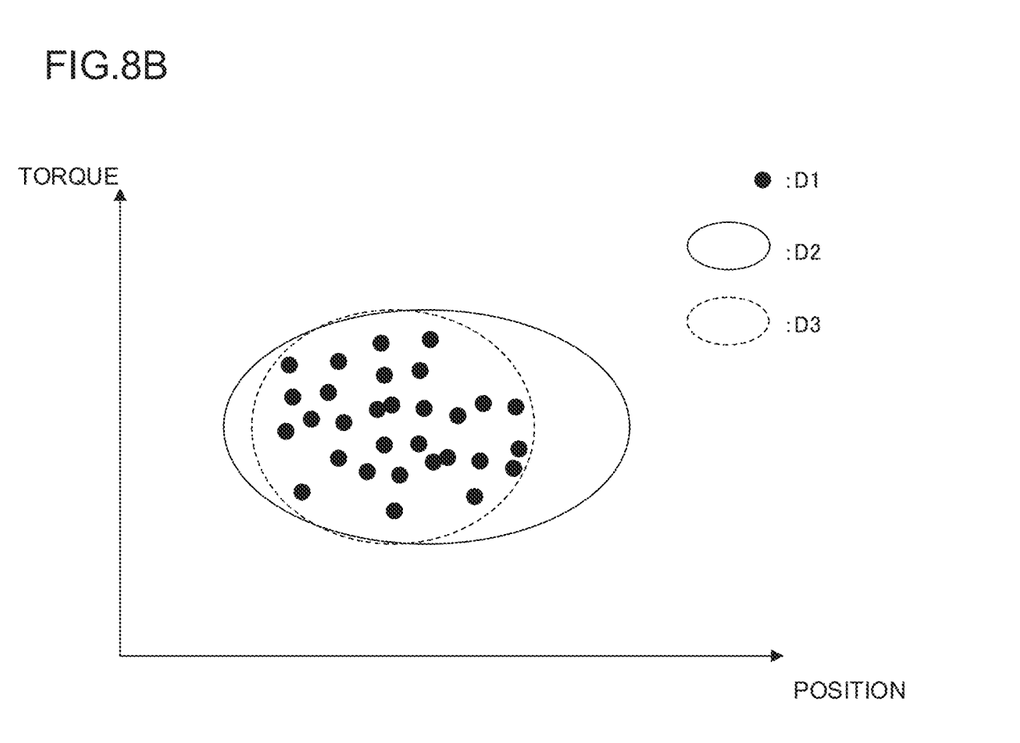

When the diagnostic apparatus performs an operation determination based on a data group while the industrial machine is in normal operation, a data group collected to set a determination model needs to cover an entire range in which the industrial machine is in normal operation to some extent. A simple example is illustrated in FIGS. 8A and 8B for description. For example, setting a model for determining normality/abnormality of the industrial machine using position data and torque data of the motor acquired when the industrial machine is in normal operation is considered. Note that in FIGS. 8A and 8B, data detected during normal operation by the diagnostic apparatus is indicated by a circle dot D1, an original range of data detected during normal operation is indicated within a frame of a solid line D2, and an expected range of data detected during normal operation is indicated within a frame of a dashed line D3.

Here, as illustrated in each of FIGS. 8A and 8B, when a set of position data and torque data detected from a motor of an industrial machine is within a solid line circle, it is presumed than the operation of the industrial machine is normal. To mechanically generate such a model based on the data acquired during normal operation, a set of position data and torque data of the motor during normal operation of the industrial machine is collected. As a result, as illustrated in FIG. 8A, when data can be acquired so as to cover the entire original range, it is possible to mechanically predict a model close to the original range D2 of the data D1 detected during normal operation. However, for example, when only data deviated from the original range can be acquired as illustrated in FIG. 8B, only a condition far from the original range of the data detected during normal operation (that is, range D3) can be mechanically predicted as indicated by a dotted circuit in FIG. 8B.

A comparatively simple example is illustrated in FIGS. 8A and 8B. However, in practice, in a case where the diagnostic apparatus determines normality/abnormality of the operation of the industrial machine based on a change pattern of time series data such as position, torque or sound, a problem becomes more complicated. In addition, for example, a similar problem occurs in the form of over-learning or convergence to a local solution even in the case of using unsupervised learning, which is one of machine learning schemes.

To solve such a problem, it is possible to consider a method in which validity of a generated model is verified, and when an invalid model is generated, data is reselected to regenerate another model. Here, when data detected during normal and abnormal operation of the industrial machine is collected, the collected data can be divided into model generation data and verification data to verify a model generated by the model generation data by means of the verification data. However, in a case where only data detected during normal operation of the industrial machine is collected, even when the data is divided into the model generation data and the verification data, validity of the division becomes a problem with a certain probability. In addition, because there is no data during abnormal operation, a response of the generated model to abnormal data cannot be verified.

SUMMARY OF THE INVENTION

Therefore, a method for verifying validity of a model generated using normal data detected during normal operation in desired.

To verify validity of a model generated using normal data, a diagnostic apparatus according to the invention generates abnormal data obtained by adding an expected change to normal data, and then uses the generated abnormal data so verify validity of the model, thereby solving the above problem.

According to the invention, the diagnostic apparatus for diagnosing an operating state of an industrial machine includes a data acquisitor for acquiring normal data related to an operating state during a normal operation of the industrial machine; an acquired data storage for storing the normal data acquired by the data acquisitor; a learner for generating a learning model by learning based on the normal data stored in the acquired data storage; an estimator for performing an estimation process for normality or abnormality of an operation of the industrial machine using the learning model; a verification data generator for generating verification data including at least one piece of abnormal data based on the normal data stored in the acquired data storage; and a verificator for verifying validity of the learning model on receiving a result of the estimation process performed by the estimator using the learning model based on the verification data.

According to the invention, it is possible to verify validity of a model generated using normal data detected during normal operation.

BRIEF DESCRIPTION OF THE DRAWINGS

The above and other objects and characteristics of the invention will be apparent from the following description of embodiments with reference to the accompanying drawings.

DETAILED DESCRIPTION OF THE PREFERRED EMBODIMENTS

An embodiment of the invention will be described below with reference to the drawings.

Figure 1:
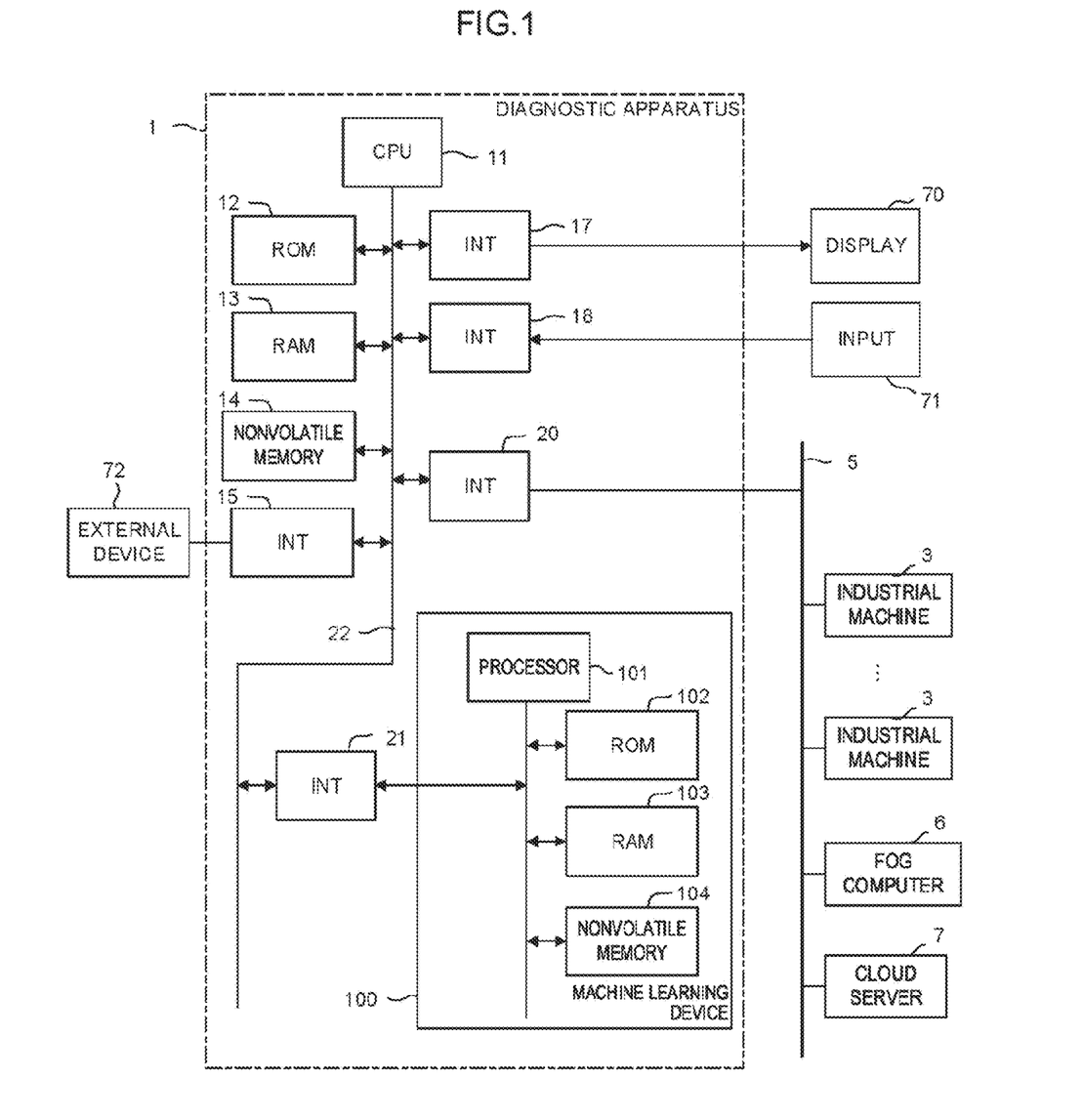
FIG. 1 is a diagram schematically illustrating a hardware configuration example of a diagnostic apparatus according to toe invention.

FIG. 1 is a diagram schematically illustrating a hardware configuration example illustrating a main part of a diagnostic apparatus according to the invention. For example, a diagnostic apparatus 1 of the invention can be mounted as a controller for controlling an industrial machine based on a control program. In addition, the diagnostic apparatus 1 of the invention can be mounted on a personal computer installed in a controller for controlling an industrial machine based on a control program, a personal computer connected via a wired/wireless network to the controller, a cell computer, a fog computer 6 or a cloud server 7. In the present embodiment, an example in which the diagnostic apparatus 1 is mounted on the personal computer connected via the network to the controller is shown.

A central processing unit (CPU) 11 included in the diagnostic apparatus 1 according to the present embodiment is a processor is configured to control the diagnostic apparatus 1 as a whole. The CPU 11 reads a system program stored in a read only memory (ROM) 12 via a bus 22 to control the entire diagnostic apparatus 1 according to the system program. A random access memory (RAM) 13 temporarily stores temporary data on calculation or display, various data input from the outside and the like.

A nonvolatile memory 14 may be configured to include a memory backed up by a battery (not illustrated), a solid state drive (SSD) and the like. Due to the configuration, a storage state is retained even when the power of the diagnostic apparatus 1 is turned OFF. The nonvolatile memory 14 stores data read from an external device 72 via an interface 15, data input via an input 71, data acquired from the industrial machine via a network 5 and other data. The various data stored in the nonvolatile memory 14 may be loaded in the RAM 13 during execution/use. In addition, various system programs such as known analysis programs are written in the ROM 12 in advance.

The interface 15 is a component provided for connecting the CPU 11 in the diagnostic apparatus 1 to the external device 72 such as a USB device. From the external device 72 side, for example, data related to the operation of each industrial machine can be read. In addition, a program, setting data and so on edited in the diagnostic apparatus 1 can be stored in external storage device or similar means via the external device 72.

In the diagnostic apparatus 1, an interface 20 is a component provided for connecting the CPU in the apparatus 1 and the wired or wireless network 5 to each other. An industrial machine 3, a fog computer, a cloud server and other devices on may be connected to the network 5, thereby data is exchanged between the diagnostic apparatus 1 and the various devices connected to the network 5.

Each piece of data read on the memory, data obtained as a result of execution of a program, data output from a machine learning device 100 described later and similar data are output via the interface 17 and displayed on a display 70. In addition, the input 71 configured with a keyboard, a pointing device or the like delivers an instruction, data and so on based on an operation of an operator via an interface 18 to the CPU 11.

In the diagnostic apparatus 1, an interface 21 is a component provided for connecting the CPU 11 and the machine learning device 100 to each other. The machine learning device 100 includes a processor 101 for controlling the entire machine learning device 100, a ROM 102 for storing in particular a system program, a RAM 103 for temporary storage in each process related to machine learning and a nonvolatile memory 104 particularly used in storage of a learning model. The machine learning device 100 can observe each piece of information (for example, data indicating an operating state of the industrial machine 3) that can be acquired by the diagnostic apparatus 1 via the interface 21. In addition, the diagnostic apparatus 1 can acquire a processing result output from the machine learning device 100 via the interface 21. The diagnostic apparatus 1 can also store and display the acquired result and further transmit the acquired result to another device via the network 5 or a similar channel.

Figure 2:
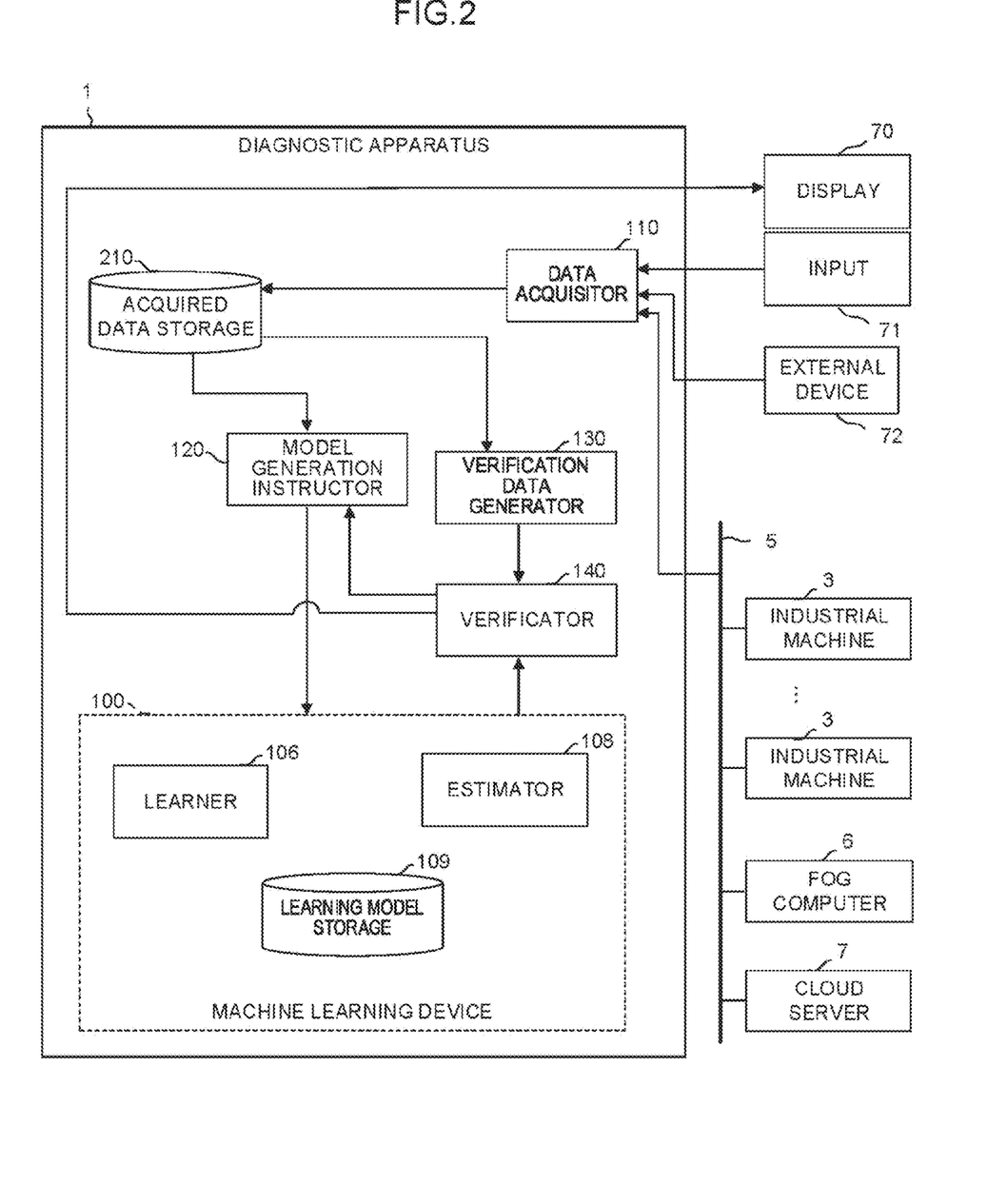
FIG. 2 is a schematic functional block diagram of a first embodiment of a diagnostic apparatus according to the invention.

FIG. 2 illustrates functions of a first embodiment of a diagnostic apparatus 1 according to the invention as a schematic functional block. Each function of the present embodiment of the diagnostic apparatus 1 is actualized by the CPU 11 included in the diagnostic apparatus 1 and the processor 101 included in the machine learning device 100 shown in FIG. 1 executing a system program and controlling an operation of each unit in the diagnostic apparatus 1 and the machine learning device 100.

The present embodiment of the diagnostic apparatus 1 includes a data acquisitor 110, a model generation instructor 120, a verification data generator 130 and a verificator 140. In addition, the machine learning device 100 included in the diagnostic apparatus 1 includes a learner 106 and an estimator 108. Furthermore, in the RAM 13 and the nonvolatile memory 14 in the diagnostic apparatus 1, an acquired data storage 210 is prepared in advance as an area for storing data acquired by the data acquisitor 110 from the industrial machine 3 and similar devices. In the RAM 103 and the nonvolatile memory 104 in the machine learning device 100, a learning model storage 109 is prepared in advance as an area for storing a learning model generated by the learner 106.

The data acquisitor 110 executes a system program read from the ROM 12 by the CPU 11 included in the diagnostic apparatus 1 shown in FIG. 1. Execution of such a program is actualized mainly by performing arithmetic processing using the RAM 13 and the nonvolatile memory 14 by the CPU 11 and input control processing by the interfaces 15, 18 and 20. The data acquisitor 110 acquires data detected during normal operation of the industrial machine 3. The data acquisitor 110 acquires various data such as position data, speed data, acceleration data and torque data of the motor of the industrial machine 3, and sound data and image data detected by a sensor (not shown) attached to the industrial machine 3. The data acquired by the data acquisitor 110 may be time series data. The data acquisitor 110 may directly acquire data from the industrial machine 3 via the network 5. The data acquisitor 110 may acquire data acquired and stored by the external device 72, the fog computer 6, the cloud server 7 and any other devices.

The model generation instructor 120 executes the system program read from the ROM 12 by the CPU 11 included in the diagnostic apparatus 1 shown in FIG. 1. Execution of such a program is actuarized mainly by performing arithmetic processing using the RAM 13 and the nonvolatile memory 14 by the CPU 11 and input/output control processing by the interface 21. The model generation instructor 120 generates learning data using at least partly data stored in the acquired data storage 210 according to an instruction from the operator via the input 71. The model generation instructor 120 further instructs the machine learning device 100 to generate a learning model based on the generated learning data. The model generation instructor 120 may instruct the machine learning device 100 to generate one learning model. Alternatively, the model generation instructor 120 may instruct the machine learning device 100 to generate a plurality of learning models. In this instance, the model generation instructor 120 may generate a plurality of different data sets by repeatedly extracting a predetermined number of pieces of data from the data stored in the acquired data storage 210, for example, using a random number. When the model generation instructor 120 generates a plurality of different data sets using the random number and so on, the model generation instructor 120 may further instruct the machine learning device 100 to generate a plurality of learning models using the generated plurality of different data sets.

The learner 106 included in the machine learning device 100 executes a system program read from the ROM 102 by the processor 101 included in the machine learning device 100 shown in FIG. 1. Execution of such a program is actualized mainly by the processor 101 performing arithmetic processing using the RAM 103 and the nonvolatile memory 104. The learner 106 generates a learning model by performing machine learning using learning data received from the model generation instructor 120, and then stores the generated learning model in the learning model storage 109. Machine learning performed by the learner 106 is a kind of known unsupervised learning. The learning model generated by the learner 106 is obtained by learning a tendency of normal data acquired during normal operation of the industrial machine 3. Examples of the learning model generated by the learner 106 include an auto-encoder (self-encoder).

The estimator 108 included in the machine learning device 100 executes the system program read from the ROM 102 by the processor 101 included in the machine learning device 100 shown in FIG. 1. Execution of such a program is actualized mainly by the processor 101 performing arithmetic processing using the RAM 103 and the nonvolatile memory 104. The estimator 108 executes an estimation process using verification data for the learning model stored in the learning model storage 109, based on an instruction from the verificator 140, to output an estimation result. The estimator 108 may perform an estimation process by the known unsupervised learning to output a score, such as a normality level or an abnormality level, as the estimation result.

Alternatively, the estimator 108 may output a vector value indicating a normality level, an abnormality level or the like as the estimation result.

The verification data generator 130 executes a system program read from the ROM 12 by the CPU 11 included in the diagnostic apparatus 1 shown in FIG. 1. Execution of such a program is actualized mainly by the CPU 11 performing arithmetic processing using the RAM 13 and the nonvolatile memory 14. The verification data generator 130 generates verification data including at least a predetermined number of pieces of abnormal data, based on data stored in the acquired data storage 210. As described above, the acquired data storage 210 stores normal data detected by the data acquisitor 110 during normal operation of the industrial machine 3. The verification data generator 130 generates abnormal data by applying a predetermined change to this normal data. The verification data generated by the verification data generator 130 may be a simple set of abnormal data. Alternatively, the verification data may include normal data and abnormal data at a predetermined ratio.

Figure 3A:
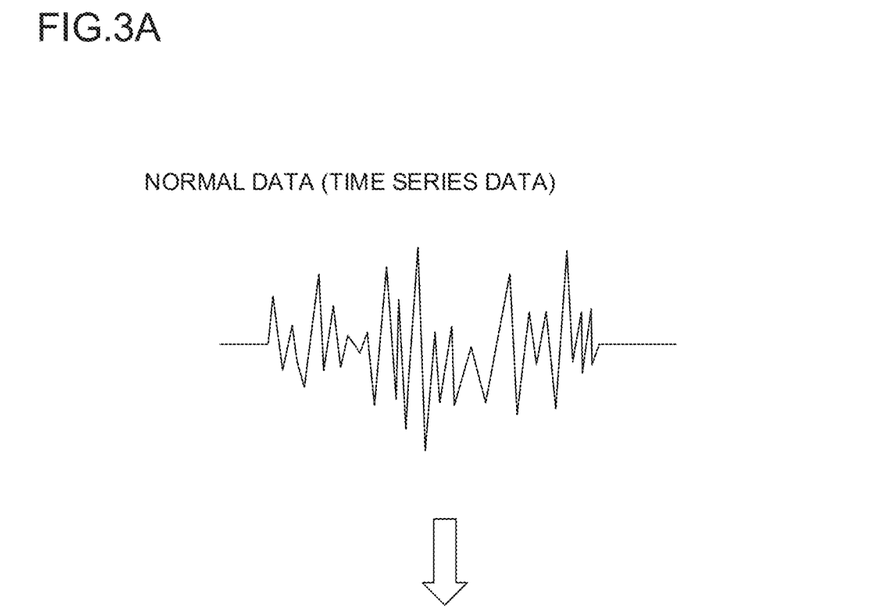
FIGS. 3A and 3B are diagrams illustrating an example of generating abnormal data by adding an impulse.
Figure 3B:
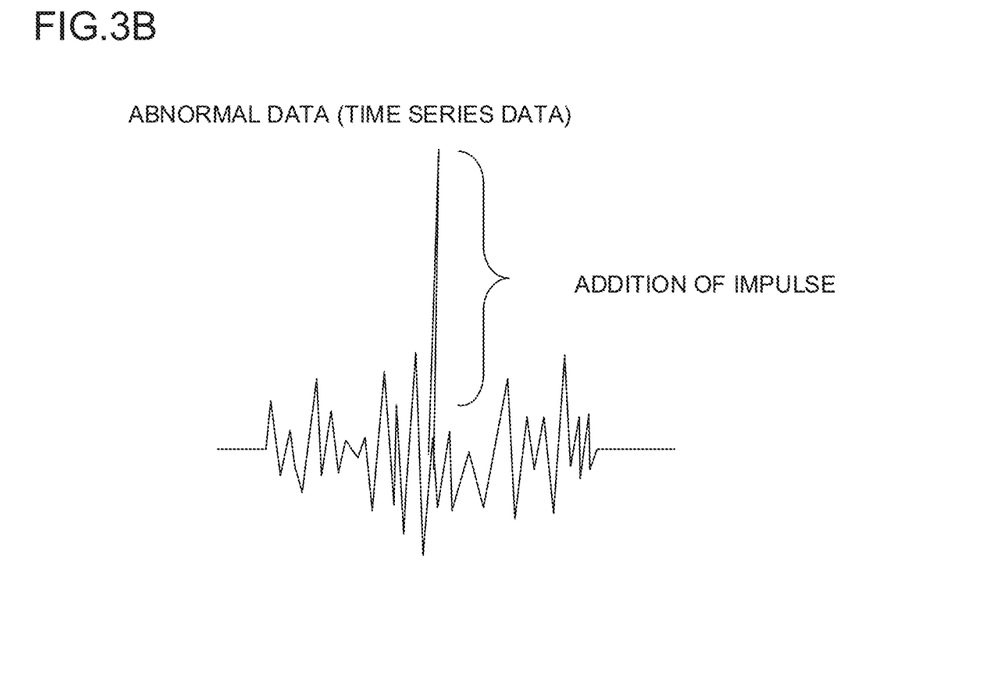

The verification data generator 130 may generate abnormal data by adding a predetermined impulse to normal data. FIGS. 3A and 3B depict an example of generating abnormal data (FIG. 3B) by adding an impulse to time series data that is normal data (FIG. 3A). As shown in FIGS. 3A and 3B, the verification data generator 130 may generate abnormal data by adding one impulse to one piece of time series data or a plurality of impulses to the piece of time series data. A position to which the impulse is applied may be given on the instruction of the operator or may be randomly determined. Furthermore, with regard to the magnitude and width of the impulse, the magnitude presumed to exceed a normal operating range may be set based on experience of the operator using the industrial machine 3. The impulse may be a negative value. Note that when a generation target of the abnormal data is image data, a dot of a predetermined color and a predetermined size may be added to a predetermined position.

Figure 4A:
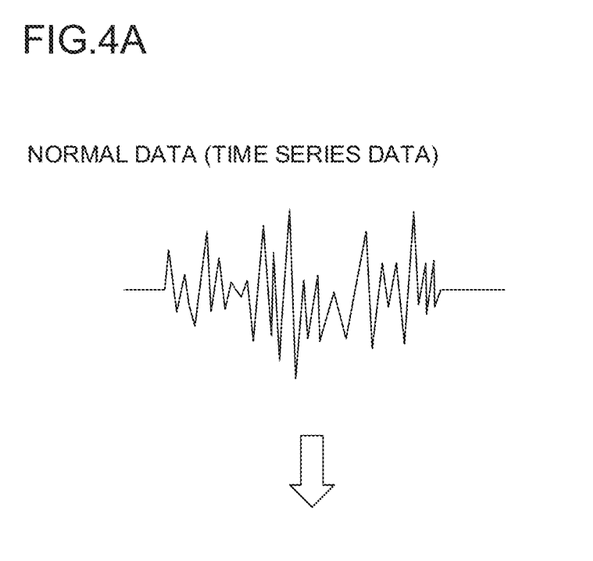
FIGS. 4A and 4B are diagrams illustrating an example of generating abnormal data by adding a fixed value component.
Figure 4B:
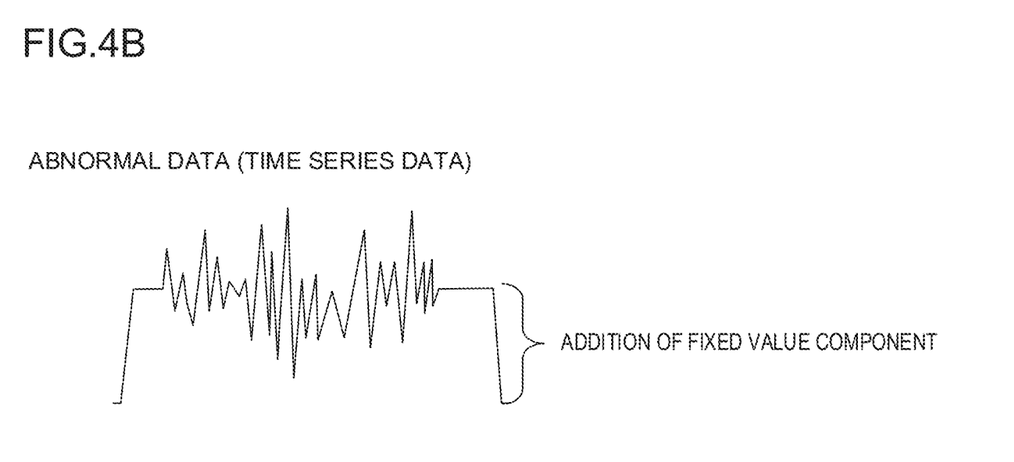

The verification data generator 130 may generate abnormal data by adding a predetermined fixed value (direct current value) component to normal data. FIGS. 4A and 4B depict an example of generating abnormal data (FIG. 4B) by adding a fixed value component to time series data that is normal data (FIG. 4A). With regard to the magnitude of the fixed value component added to the time series data by the verification data generator 130, the magnitude presumed to exceed a normal operating range may be set based on an experience of the operator using the industrial machine 3. The fixed value component added by the verification data generator 130 to the time series data may be a negative value. Note that when a generation target of the abnormal data is image data, a color component of the entire image data may be changed by a predetermined amount.

Figure 5A:
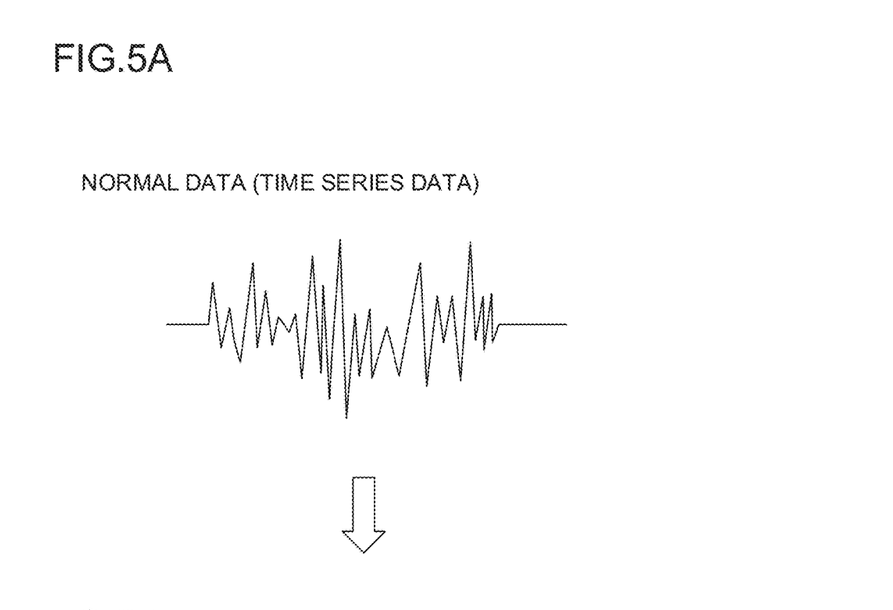
FIGS. 5A and 5B are diagrams illustrating an example of generating abnormal data by adding an ax b component.
Figure 5B:
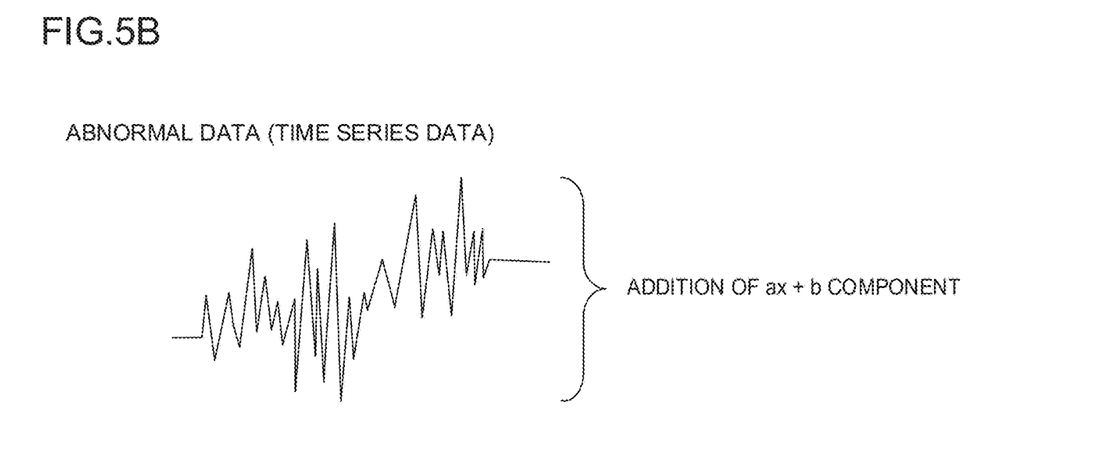

The verification data generator 130 may generate abnormal data by adding a predetermined ax+b component to normal data. FIGS. 5A and 5B are an example of generating abnormal data. (FIG. 5B) by adding the ax+b component to time series data that is normal data (FIG. 5A). With regard to coefficients a and b of the ax+b component added to the time series data by the verification data generator 130, the magnitude presumed to exceed a normal operating range may be set based on experience of the operator using the industrial machine 3. Note that when a generation target of the abnormal data is image data, color components of the entire image data may be changed to gradation.

The verification data generator 130 may generate abnormal data by adding a predetermined frequency component to normal data. The verification data generator 130 may generate abnormal data by adding one frequency component to one piece of time series data or a plurality of frequency components to the piece of time series data. With regard to the frequency value and magnitude of the frequency component, the magnitude presumed to exceed a normal operating range may be set based on experience of the operator using the industrial machine 3. Note that when a generation target of the abnormal data is image data, conversion may be performed by adding a predetermined two-dimensional frequency component to the entire image data.

Figure 6A:
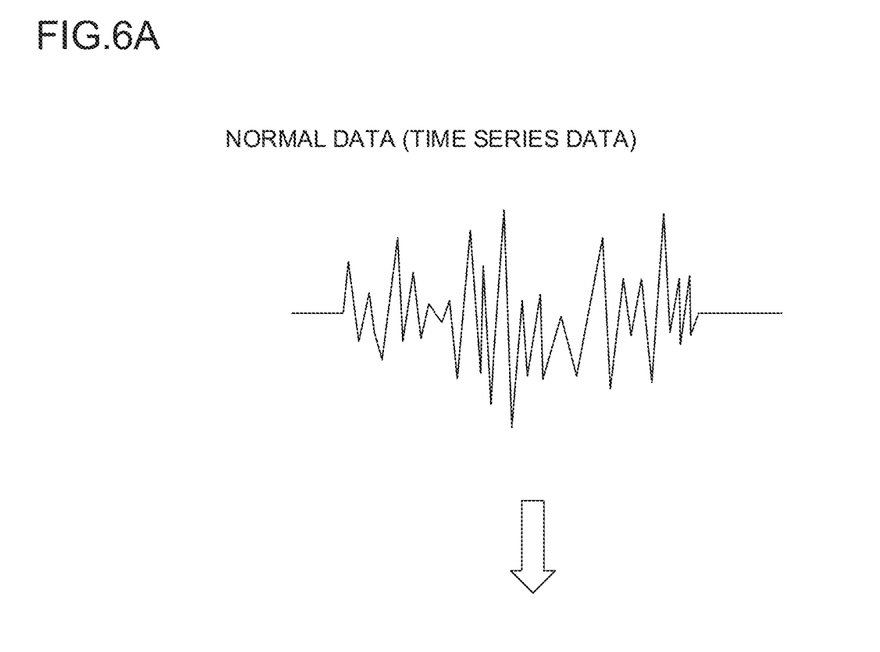
FIGS. 6A and 6B are diagrams illustrating an example of generating abnormal data due to a data value defect.
Figure 6B:
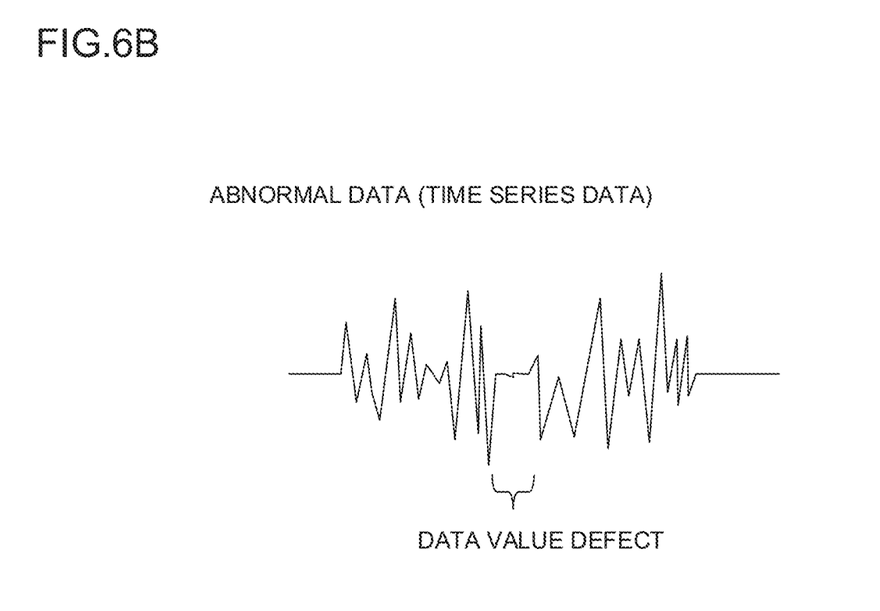

The verification data generator 130 may generate abnormal data by adding a predetermined data value defect to normal data. FIGS. 6A and 6B are an example of generating abnormal data (FIG. 6B) by adding the data value defect to time series data that is normal data (FIG. 6A). As shown in FIGS. 6A and 6B, the verification data generator 130 may generate abnormal data by adding one data value defect or a plurality of data value defects to one piece of time series data. A position to which the data value defect is applied may be randomly determined or be given on the instruction of the operator. Furthermore, with regard to a width of the data value defect, the magnitude presumed to exceed a normal operating range may be set based on experience of the operator using the industrial machine 3. Note that when a generation target of the abnormal data is image data, a black or white point of a predetermined size may be added to a predetermined position.

Figure 7A:
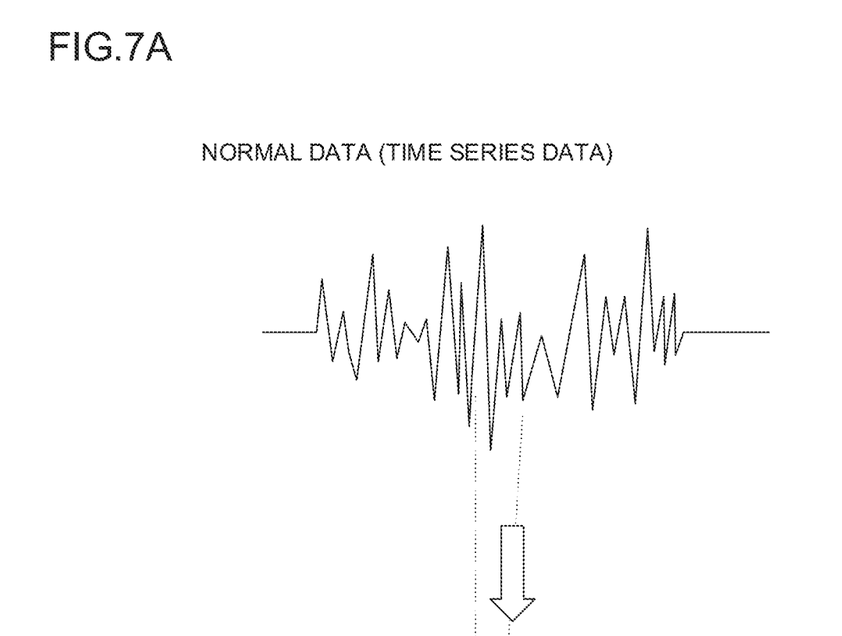
FIGS. 7A and 7B are diagrams illustrating an example of generating abnormal data due to a sampling defect.
Figure 7B:
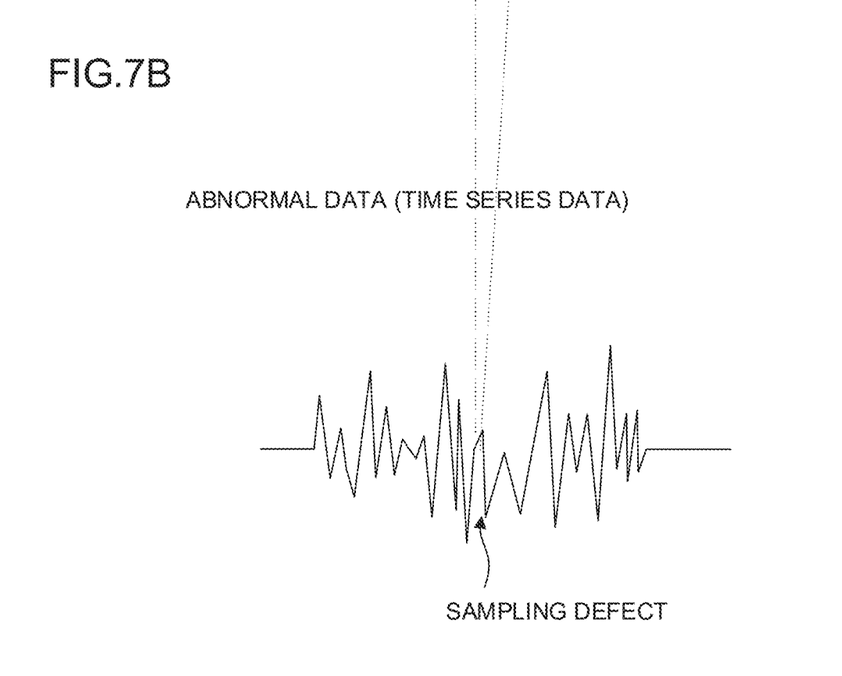

The verification data generator 130 may generate abnormal data by adding a predetermined sampling defect to normal data. FIGS. 7A and 7B depict an example of generating abnormal data (FIG. 7B) by adding the sampling defect to time series data that is normal data (FIG. 7A). As shown in FIGS. 7A and 7B, the verification data generator 130 may generate abnormal data by adding one sampling defect or a plurality of sampling defects to one piece of time series data. A position to which the sampling defect is applied may be given on the instruction of the operator or may be randomly determined. Furthermore, with regard to a width of the sampling defect, the magnitude presumed to exceed a normal operating range may be set based on experience of the operator using the industrial machine 3.

The verification data generator 130 may include the abnormal data generated by the plurality of methods described above in one set of verification data. Alternatively, the verification data generator 130 may generate abnormal data by combining the plurality of methods described above.

The verificator 140 is actualized by the CPU 11 included in the diagnostic apparatus 1 shown in FIG. executing a system program read from the ROM 12 and performing arithmetic processing's mainly using the RAM 13 and the nonvolatile memory 14. The verificator 140 verifies validity of the learning model stored in the learning model storage 109 using the verification data generated by the verification data generator 130. The verificator 140 subsequently outputs a verification result.

For example, when one learning model is stored in the learning model storage 109, the verificator 140 instructs the estimator 108 to perform estimation based on the verification data using the learning model, and outputs an estimation result to, for example, the display 70. The operator determines the validity of the learning model by looking at the estimation result output to the display 70. In this instance, a predetermined conditional expression may be set in advance, after that the verificator 140 may determine that the learning model is invalid when the conditional expression is dissatisfied. When the verificator 140 determines that the learning model is invalid, the verificator 140 may further instruct the model generation instructor 120 to regenerate the learning model. In addition, the verificator 140 may calculate a known machine learning evaluation value such as an ROC curve or an AUC value and display the evaluation value on the display 70. When the operator confirms display of such a verification result and determines that a valid learning model is generated, the operator may use the learning model stored in the learning model storage 109 for the actual state determination of the industrial machine. On the contrary, when it is determined that the valid learning model may not be generated, the operator may instruct the model generation instructor 120 to regenerate the learning model.

For example, when a plurality of learning models is stored in the learning model storage 109, the verificator 140 may instruct the estimator 108 to perform estimation based on the verification data using each learning model to select a learning model in which an average result is estimated among the estimation results obtained by the estimator 108 as a valid learning model. The average of the estimation results means that the estimation results obtained by inputting the verification data to the learning model indicate a median value that is not significantly shifted from estimation results of other learning models. For example, the verificator 140 expresses, as a multidimensional vector, a plurality of estimation results obtained by using a plurality of pieces of verification data using a learning model. Next, the verificator 140 performs a publicly known outlier test on the estimation results of the plurality of multidimensional vectors obtained from the respective learning models. In this way, the verificator 140 can use a learning model other than a learning model estimating an outlier as a valid learning model that estimates a relatively average result. In addition, for example, the verificator 140 may express a plurality of estimation results obtained by using a plurality of pieces of verification data using a learning model as a multidimensional vector. The verificator 140 may use, as a valid learning model that estimates a relatively average result, a learning model that estimates a result in which a distance from an average vector of inference results of a plurality of multidimensional vectors obtained from each learning model is small. The verificator 140 may automatically select a learning model estimating the most average result as a valid learning model, or output some learning models indicating a relatively average estimation result to the display 70 so that the operator can select a valid learning model from the output learning models.

Hereinafter, a schematic description will be given of an alternative embodiment that can be adopted by the diagnostic apparatus of the invention. In addition to setting values such as the magnitude of the impulse or the fixed value component at the time of generating the abnormal data from the normal data, and the frequency value or the magnitude of the frequency component to values based on experience of the operator, for example, when a small amount of abnormal data is stored in the fog computer, the cloud server or the like, the verification data generator 130 included in the alternative embodiment of the diagnostic apparatus 1 may analyze the abnormal data to determine and use the magnitude of the impulse data and the fixed value data to be detected as abnormal, the frequency value and the magnitude of the frequency component, and the like. It is difficult to collect a large amount of abnormal data. However, a small number of abnormal data can be collected on a network to which many industrial machines 3 are connected. Therefore, by analyzing and using the tendency of impulses, fixed value components, and frequency components detected as abnormal from a small number of abnormal data, it is possible to eliminate the need for setting based on the experience of the operator.

The present embodiment of the diagnostic apparatus 1 having the above-mentioned constitution makes a predetermined change to normal data acquired during normal operation of the industrial machine 3 to generate abnormal data, thereby generating data used in verification of a learning model. For this reason, it is unnecessary to collect a predetermined number of pieces of abnormal data, which are difficult to collect, so that validity of the learning model can be easily verified.

Even though some embodiments of the invention has been described above, the invention is not limited to only the above-mentioned embodiments. The invention can be implemented in various modes by making appropriate changes.

The invention claimed is:

1. A diagnostic apparatus for diagnosing an operating state of an industrial machine, the diagnostic apparatus comprising:
a data acquisitor for acquiring normal data related to an operating state during a normal operation of the industrial machine;
an acquired data storage for storing the normal data acquired by the data acquisitor;
a learner for generating a learning model by learning based on the normal data stored in the acquired data storage;
an estimator for performing an estimation process for normality or abnormality of an operation of the industrial machine using the learning model;
a verification data generator for generating verification data including at least one piece of abnormal data based on the normal data stored in the acquired data storage; and
a verificator for verifying validity of the learning model on receiving a result of the estimation process performed by the estimator using the learning model based on the verification data, wherein
the learner generates a plurality of learning models,
the verificator causes the estimator to perform estimation based on the verification data using each of the plurality of learning models, and
the verificator selects an average learning model from estimation results obtained by the estimator as a valid learning model.

2. A diagnostic apparatus for diagnosing an operating state of an industrial machine, the diagnostic apparatus comprising:
a data acquisitor for acquiring normal data related to an operating state during a normal operation of the industrial machine;
an acquired data storage for storing the normal data acquired by the data acquisitor;
a learner for generating a learning model by learning based on the normal data stored in the acquired data storage;
an estimator for performing an estimation process for normality or abnormality of an operation of the industrial machine using the learning model;
a verification data generator for generating verification data including at least one piece of abnormal data based on the normal data stored in the acquired data storage; and
a verificator for verifying validity of the learning model on receiving a result of the estimation process performed by the estimator using the learning model based on the verification data, wherein
the verificator causes the estimator to perform estimation based on the verification data using the learning model, and
the verificator determines that the learning model is invalid to regenerate a learning model when an estimation result obtained by the estimator dissatisfies a predetermined condition.

3. A diagnostic apparatus for diagnosing an operating state of an industrial machine, the diagnostic apparatus comprising:
a data acquisitor for acquiring normal data related to an operating state during a normal operation of the industrial machine;
an acquired data storage for storing the normal data acquired by the data acquisitor;
a learner for generating a learning model by learning based on the normal data stored in the acquired data storage;
an estimator for performing an estimation process for normality or abnormality of an operation of the industrial machine using the learning model;
a verification data generator for generating verification data including at least one piece of abnormal data by applying a predetermined change to the normal data stored in the acquired data storage; and
a verificator for verifying validity of the learning model on receiving a result of the estimation process performed by the estimator using the learning model based on the verification data,
wherein the verification data generator is configured to generate abnormal data by adding to normal data at least one of an impulse, a fixed value component, an ax+b component, a frequency component, a data value defect or a sampling defect,
the diagnostic apparatus further comprises a display, wherein when a generation target of the abnormal data is an image,
the verification data generator is configured to
add a dot of a predetermined color and a predetermined size to a predetermined position on the display, when the impulse is added to normal data, change a color component of entire image data by a predetermined amount when the fixed value component is added to normal data,
change color components of the entire image data to gradation when the ax+b component is added to normal data,
add a predetermined two-dimensional frequency component to the entire image data when the frequency component is added to normal data, and
add a black or white point of a predetermined size to a predetermined position on the display when the data value defect is added to normal data, and
the verificator is configured to output an estimation result obtained by the estimator to the display.

4. The diagnostic apparatus according to claim 3, wherein the learning model is an auto-encoder.

5. The diagnostic apparatus according to claim 3, wherein the verification data is a set of abnormal data, or includes normal data and abnormal data at a predetermined ratio.

* * * * *